G. F. GEB.
LAWN MOWER.
APPLICATION FILED MAY 31, 1911.
1,102,734.
Patented July 7, 1914.
2 SHEETS—SHEET 1.
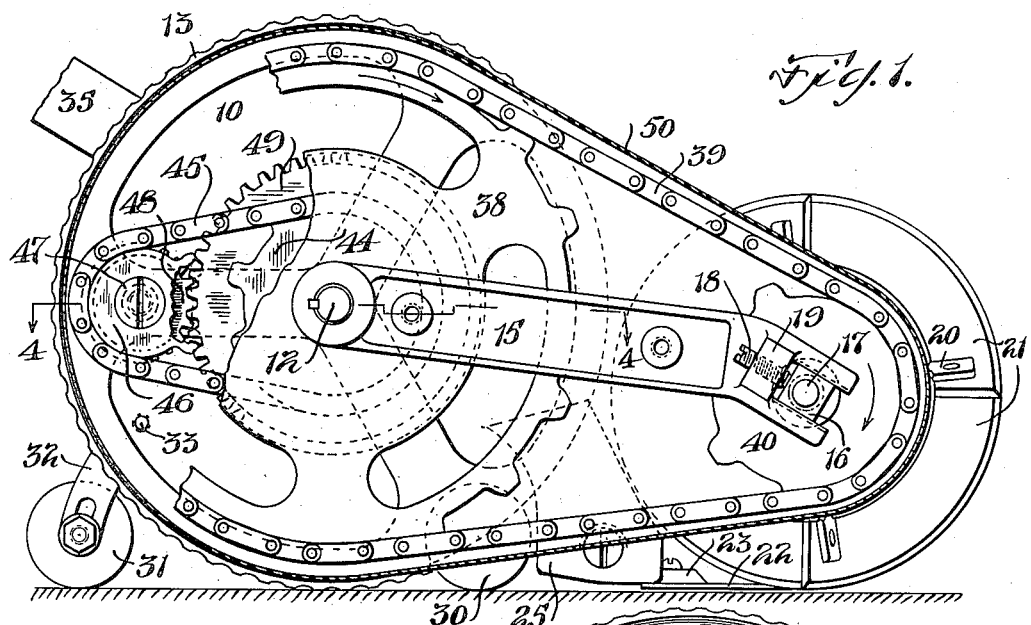
Fig. 1.
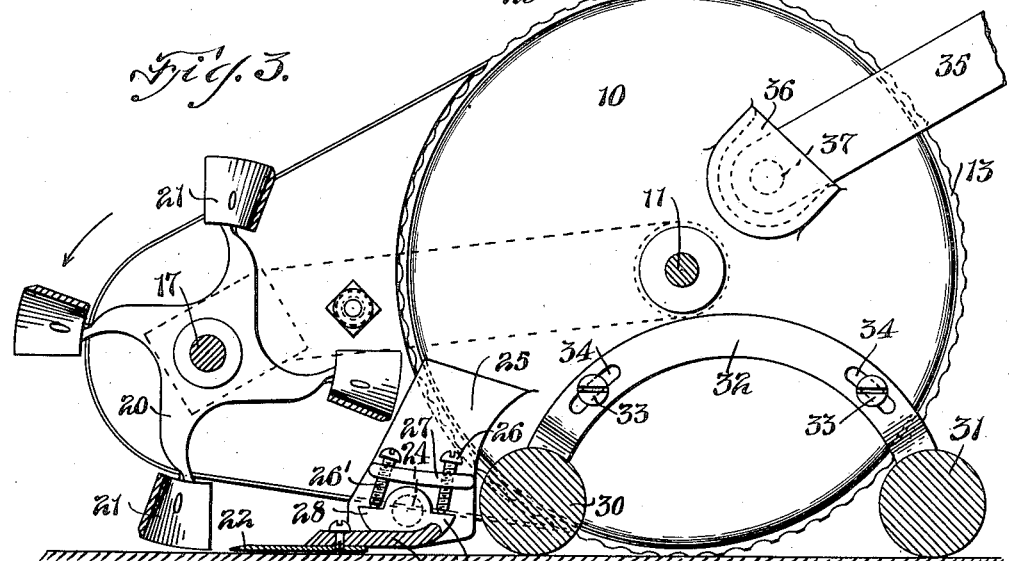
Fig. 3.
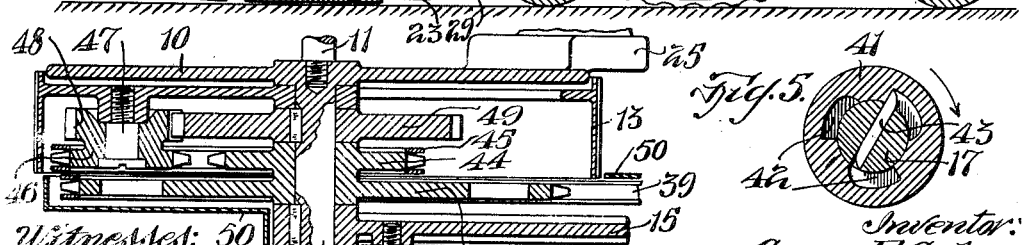
Fig. 5.
Fig. 4.
Witnesses:
Harry L. Allen
A. L. Folsom
Inventor:
George F. Geb
by Albright Brown Dunlevy May
attys

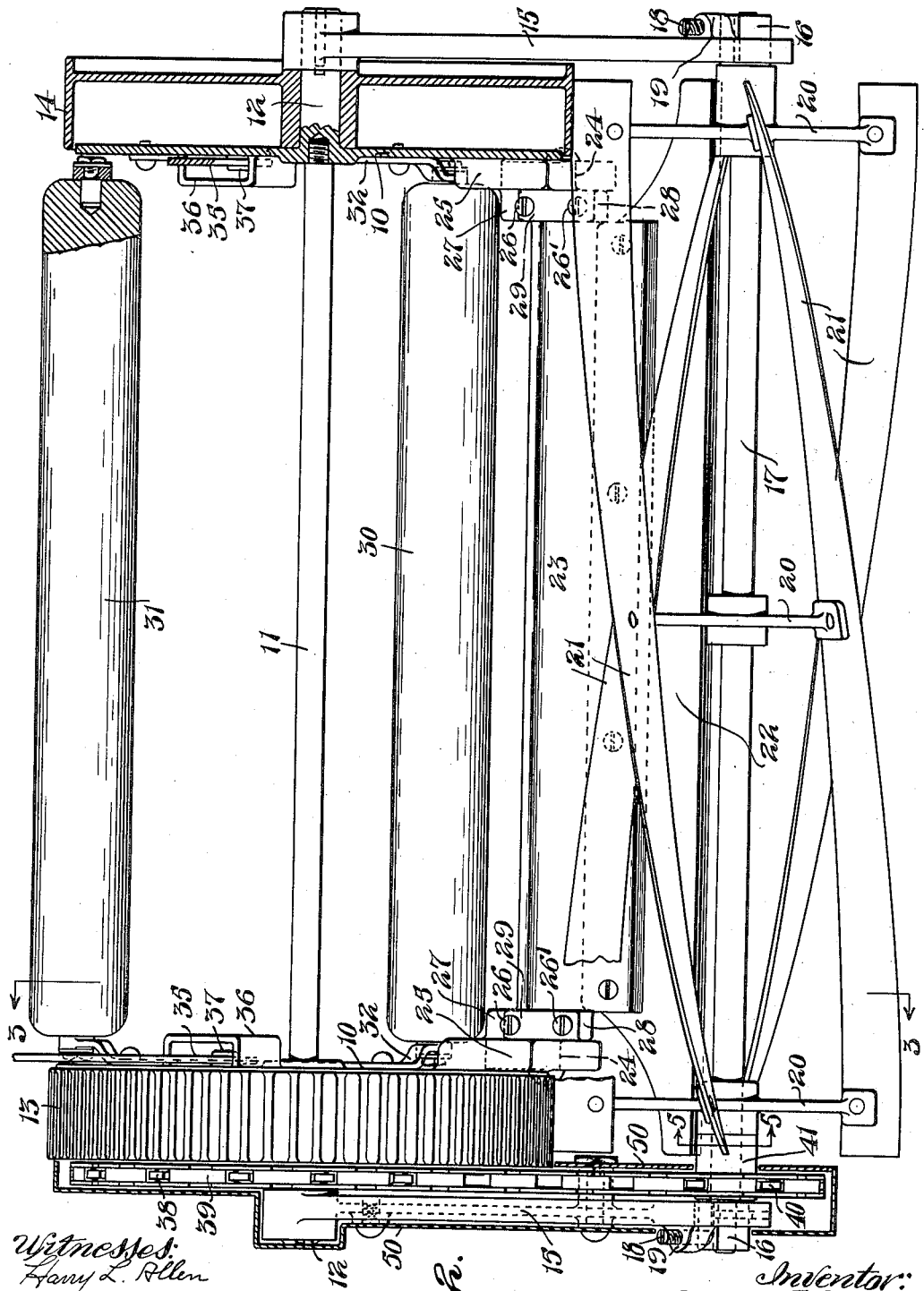

UNITED STATES PATENT OFFICE.

GEORGE F. GEB, OF FRANKLIN, MASSACHUSETTS.

LAWN-MOWER.

1,102,734.

Specification of Letters Patent. Patented July 7, 1914.

Application filed May 31, 1911. Serial No. 630,510.

*To all whom it may concern:*

Be it known that I, GEORGE F. GEB, a citizen of the United States, and resident of Franklin, in the county of Norfolk and State of Massachusetts, have invented certain new and useful Improvements in Lawn-Mowers, of which the following is a specification.

This invention has relation to manually-operated lawn mowers. As ordinarily constructed, such mowers are provided with one or more driving wheels located beyond the ends of the cutters or knives so that, when the mower is passed across the lawn, the wheels crush and beat down a strip of turf, and consequently on the next passage of the mower over the lawn, the beaten-down grass or turf is not properly cut.

The present invention contemplates a construction and arrangement in which the driving wheel or wheels are located in the rear of the knives or cutters and are arranged substantially within the planes of the ends of the cutters. According to this construction and arrangement, the wheels engage or rest practically upon only that portion of the turf which has been cut by the knives or cutters in advance of them.

The invention further contemplates a novel construction and arrangement of gearing for operating the cutters at a relatively high speed from the drive wheel or wheels located as hereinbefore indicated.

Referring to the accompanying drawings,—Figure 1 represents a side elevation of a lawn mower embodying my invention. Fig. 2 (Sheet 2) illustrates a plan view of the machine with one of the ground wheels in section. Fig. 3 represents a longitudinal section on the line 3—3 of Fig. 2. Fig. 4 represents a section on the line 4—4 of Fig. 1 and illustrates a portion of the power-transmitting gearing. Fig. 5 represents in section the clutch which permits the mower to be moved rearward without effecting the actuation of the cutters.

Referring to the drawings,—10 10 illustrate the side plates or frames of the machine which are substantially circular and which are connected together by a cross bar 11 secured thereto in any convenient manner. As illustrated, the ends of the rod or cross bar are threaded into sockets formed centrally in the inner faces of the side plates. Each of the plates is provided with an outwardly projecting stud shaft 12 on which is loosely journaled a ground wheel, the ground wheels being indicated at 13 14 respectively. I have contemplated extending the ends of the cross bar through the side plates to constitute the journals for the ground wheels, in which event the cross bar would be affixed to the side plates to prevent relative rotation. From either or both of the ground wheels power may be transmitted to the rotary cutter. Secured upon the ends of the stud shafts 12 which project beyond the ground wheels are forwardly projecting arms or bars 15 15 whose forward ends project forwardly and downwardly and are slotted to receive boxes 16, in which is journaled the rotary cutter shaft 17. Adjusting screws 18 threaded into lugs 19 on the outer sides of the arms 15 bear against the boxes and serve to adjust the shaft 17 bodily transversely of its axis for a purpose to be subsequently described. It will be noted that the arms 15 are located outside or beyond the outer faces of the ground wheels 14 and that the bearings or journal boxes 16 for the cutter shaft 17 are also located beyond the bearings for said wheels. Attached to spiders 20, secured to the cutter shaft 17, are the helical cutters 21, of the usual construction, which coöperate with a fixed or shearing blade or knife 22 (see Fig. 1). By reason of the construction and arrangement hereinbefore described, it will be seen that it has been possible to elongate the helical cutters so that their ends lie in front of the ground wheels so as to cut the grass in front of said wheels. In other words, the ground wheels lie in the rear of and substantially between the outer ends of the cutters, so that, when the lawn mower is moved forward, the wheels rest upon that portion of the turf from which the grass has been cut.

The fixed blade 22 is secured in any suitable way to the underside of a transverse support 23 having at its ends trunnions 24 journaled in brackets 25 projecting inwardly and forwardly from the side plates 10, as illustrated in Figs. 2 and 3. The support 23 and the blade 22 may be adjusted rotatively about the axis of the trunnions by screws 26 26' passed through flanges 27 on the brackets and engaging shoulders 28 29 respectively on the said support 23.

For the purpose of effecting a bodily adjustment of the rotary cutters 21 and the blade 22 toward and from the ground, I provide two rollers 30 31. These may be made of wood and are journaled on the ends of arcuate bars or supports 32 which are secured to the plates 10 10 by suitable fastenings such as screws 33 passed through curved slots 34 in said bars or supports. The roller 31 is adjustable with respect to its supports, the rod on which the roller is journaled passing through slots and being clamped by nuts. It will be noted that the roller is in front of the ground wheels, whereas the roller 31 is in the rear thereof. Consequently these rollers serve to prevent rotation of the said side plates and to hold the cutting mechanism off from the ground. By adjusting the arcuate bars or supports in one direction or the other, the cutting mechanism may be raised or lowered relatively to the ground the distance desired, and by adjusting the roll 31, the ground wheels have the desired traction. The side plates 10, the side bars or arms 15, the blade support 23, and the bar 11, all constitute a rigid support or frame for the cutting mechanism.

I have not illustrated the handle of the lawn mower which may be of the usual form. I have only shown the ends 35 of the yoke which is at the lower end of the handle, the ends of which yoke extend into sockets formed on the inner faces of the side plates as indicated at 36 and are attached thereto by pivots 37. This permits a limited rocking movement of the free end of the handle to adapt it to the height of the operator.

On account of the arrangement of the cutters in advance of the ground wheels, I have provided a novel mechanism for imparting power to the rotary cutter. From the description which I shall give, it will be apparent that both ground wheels may be utilized to drive the cutter or that the power may be derived from only one of them. In the form illustrated in the drawings, power is transmitted to the rotary cutter shaft from the ground wheel 13. Loosely mounted on the stud shaft 12 on which the wheel 13 is journaled, there is a sprocket wheel 38 with which is engaged a sprocket chain 39, the latter engaging and driving a smaller sprocket wheel 40 on the shaft 17. The hub 41 of the sprocket wheel 40 is formed with clutch sockets 42, as illustrated in Fig. 5, to be engaged by a clutch pin of the usual construction passed through the shaft 17, so that, when the sprocket wheel 40 is rotated forwardly, the cutter will be rotated with it, the movement of the sprocket wheel in the opposite direction having no rotative effect upon the cutter shaft. Any other form of clutch mechanism for accomplishing the same end may be utilized in any part of the transmitting gear in lieu of that shown and described.

The hub of the driving sprocket wheel 38 is formed with a sprocket wheel 44 connected by a sprocket chain 45 with a sprocket wheel 46 journaled on a pin 47 projecting from the web of the driving wheel 13. It will be noted that the driving wheel is cup-shaped and that the sprocket wheels 44 and 46 are located within the cavity in the wheel. The hub of the sprocket wheel 46 is formed with a planetary pinion 48 which engages a stationary gear 49 keyed or otherwise rigidly secured to the stud shaft 12 whereby it is held against rotation. In virtue of this construction and arrangement, the rotation of the ground wheel 13 causes the revolution of the planetary gear 48 about the gear 49 and its rotation about its own axis, in consequence of which the sprocket wheel 44 is driven at a greater rate of speed than the ground wheel 13. This speed is multiplied in its transmission to the rotary cutter shaft by the large sprocket wheel 38 and the smaller sprocket 40 on the cutter shaft. It is evident that I may vary the ratio of the coacting gears or sprockets so as to secure any desired speed of rotation of the rotary cutter. The sprocket chain 39 and the sprocket wheels 38 and 40 are inclosed in a suitable guard or hood 50 which is secured to one of the side bars 15 by suitable fastenings so that grass and dirt are prevented from clogging the driving mechanism.

In the event that if it is desired to drive the cutter from both ground wheels, it is merely necessary to duplicate the transmitting mechanism which I have herein described, and in such case the additional power-transmitting mechanism would be covered by a hood or guard similar to that illustrated.

The adjusting screws 18, which I have previously referred to, provide for adjusting the cutter bar so as to secure the desired tension on the sprocket chain 39, and, when the cutter shaft is thus moved, the stationary blade 22 may be likewise adjusted to bring it into proper shearing relation to the helical cutters.

Having now particularly explained the nature of my said invention and described a way of constructing and using the same, although without attempting to set forth all of the forms in which it may be made or all of the modes of its use, what I claim is:

1. A lawn mower comprising ground wheels, side plates upon which said ground wheels are journaled and located between the latter, side bars attached to said side plates and located outside of said wheels, a stationary blade secured to said side plates at a point between said wheels, rotary cutters journaled in said side bars, said stationary blade and said rotary cutters having their ends located directly in front of said ground wheels, and power transmitting gearing for transmitting power from one of said ground wheels to said rotary cutters and located outside of said ground wheels.

2. In a lawn mower, ground wheels, side frames between said ground wheels and having outwardly projecting trunnions on which the ground wheels are journaled, side bars secured to said trunnions, said wheels being between said side bars and said side frames, a rotary cutter shaft journaled in said side bars and having cutters, and a stationary blade secured to said side frames at a point between said wheels, the ends of said cutters and said stationary blade being located directly in front of said ground wheels.

3. A lawn mower comprising axially alined ground wheels, a fixed blade, rotary cutters, a ground roll in the rear of the axis of the ground wheels, a ground roll in front of said axis, and curved supports for said rolls adjustable in arcuate paths.

4. A lawn mower comprising axially alined ground wheels, cutting mechanism including a fixed blade and rotary cutters, side plates inside said ground wheels, rolls located respectively in front and in rear of the axis of the ground wheels, and supports for said rolls attached to the side plates and adjustable to move said rolls simultaneously and thereby to vary the height of the cutting mechanism from the ground.

5. A lawn mower comprising a frame, a fixed cutting blade, a cutter shaft having cutters in shearing relation to said fixed blade, a dished driving wheel located in the rear of the cutters, a fixed gear axially alined with the ground wheel, a planetary gear carried therearound by and mounted on said driving wheel, a power-transmitting member in axial alinement with the driving wheel, said planetary gear and said member being located within the rim of the ground wheel, means for transmitting power from the planetary gear to said power-transmitting member, and means for transmitting power from said power-transmitting member to said cutter shaft.

6. In a lawn mower, a frame, a fixed blade, a cutter shaft having cutters thereon to coöperate with the fixed blade, a dished driving wheel, and mechanism for transmitting power to said shaft from said driving wheel, comprising a gear in axial alinement with said driving wheel and fixed to said frame, a planetary gear intermeshing with said fixed gear and carried by said driving wheel, a rotary sprocket wheel in axial alinement with said fixed gear, a sprocket wheel revoluble and rotatable with said planetary gear, a chain connecting said last-mentioned sprocket wheels, said fixed gear, said planetary gear, said sprocket wheel and said chain being all located within the rim of the driving wheel, and power-transmitting means for transmitting power from said rotary sprocket wheel to said cutter shaft.

7. In a lawn mower, a frame, a rotary cutter shaft having helical cutters thereon, a fixed blade for coöperation with the helical cutters, ground wheels, of which one is dished, a sprocket wheel on said shaft, a sprocket wheel in axial alinement with the ground wheels, a chain connecting said sprocket wheels, a non-rotary gear in axial alinement with said ground wheels, a planetary gear carried by one of the ground wheels and intermeshing with the fixed gear, and power-transmitting connections between said planetary gear and the second-mentioned sprocket wheel, said planetary gear and non-rotary gear being located within the rim of said dished ground wheel.

8. A lawn mower comprising a fixed blade, a cutter shaft having cutters to coöperate with the fixed blade, a fixed shaft, a driving ground wheel mounted on said shaft and having a rim, a fixed gear on said shaft in axial alinement with the ground wheel, a planetary gear journaled on the ground wheel and intermeshing with the fixed gear, said fixed and planetary gears being within the rim of the ground wheel, and mechanism for transmitting power from said planetary gear to said cutter shaft.

In testimony whereof I have affixed my signature, in presence of two witnesses.

GEORGE F. GEB.

Witnesses:
MARCUS B. MAY,
A. L. FOLSOM.